Dec. 9, 1941.   I. A. DEADY   2,265,804
WASHING AND CLEANSING DEVICE
Filed Jan. 5, 1939

INVENTOR
IRENE A. DEADY
BY
ATTORNEY

Patented Dec. 9, 1941

2,265,804

UNITED STATES PATENT OFFICE 2,265,804

WASHING AND CLEANSING DEVICE

Irene A. Deady, Long Beach, N. Y.

Application January 5, 1939, Serial No. 249,357

2 Claims. (Cl. 15—129)

This invention relates to washing and cleansing devices of the fountain type.

The main object of this invention is the production of a washing and cleansing device of the fountain type comprising a rubbing element which is highly yielding and flexible to simulate the operation of a mop and to which a large amount of cleansing fluid such as water may be supplied and which is provided with a pocket to receive a cake of soap or other cleansing agent or a container of soap, etc.

Another object of this invention is an improved nozzle construction for directing a large supply of water to the rubbing element and which is adapted to receive a cleansing agent, if desired, and which is provided with perforations to feed water to and through the upper end of the rubbing element to keep this part of the rubbing element clean, and which may be used in rinsing.

Another object of this invention is the provision of a combination of nozzle, hose, handle and rubbing element which are readily detachable from each other facilitating renewal of the rubbing element and the substitution of different types of rubbing, scouring and rinsing elements, etc.

Another object of this invention is a combination of such elements arranged so that the pull of the rubbing element on the nozzle will be reduced to a minimum, the means disclosed comprising means for attaching the nozzle and rubbing element separately to the handle.

Figure 1:
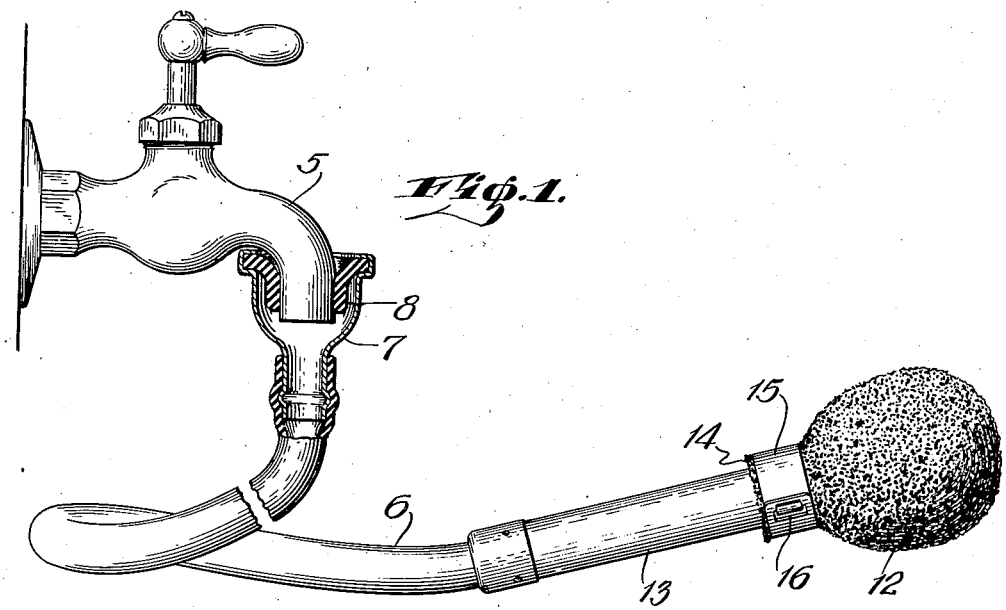
Figure 2:
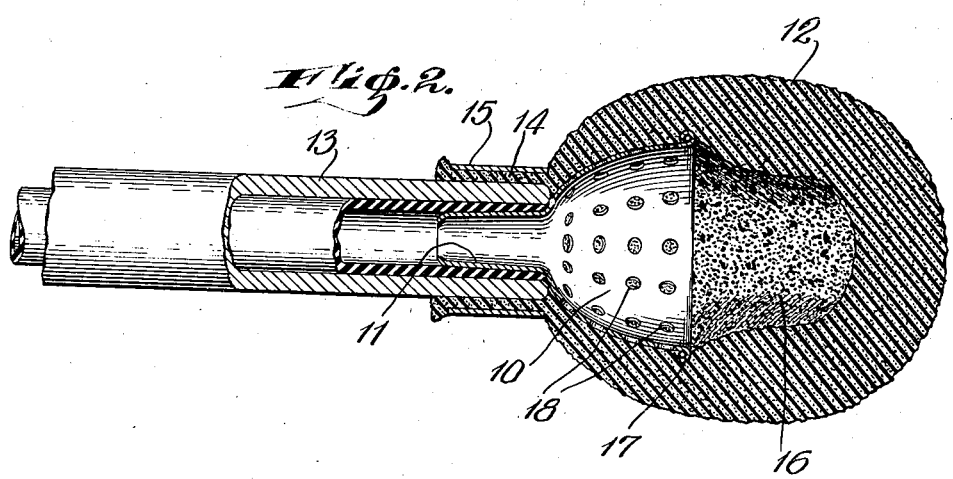

Other objects of the invention will appear from the following description taken in connection with the drawing in which, Fig. 1 shows my improved washing and cleansing device connected to a faucet; and Fig. 2 shows a longitudinal section taken through the nozzle and rubbing element, and through the adjacent ends of the handle and hose.

Water may be supplied from a faucet 5, Fig. 1, through a hose 6 connected at one end to the faucet by any desired connector 7 of the usual construction embodying a funnel shaped diaphragm 8, or the hose 6 may be attached directly to the faucet. The connection between the hose and the faucet is not a part of my invention though I prefer to equip the hose with a faucet connector of the character disclosed.

Attached to the other end of the hose is a nozzle 10, the body portion of which may be conical or spherical substantially as disclosed or of different shape, if desired. The nozzle is provided with a stem 11 which may have its outer surface plain, or corrugated or threaded if desired in a well known manner, and which is of such diameter that the hose will grip its outer surface when assembled as shown in Fig. 2.

For the purpose of manipulating the nozzle and the porous rubbing element 12 described more in detail later, I provide a handle 13 which comprises a cylindrical sleeve-like member the inside diameter of which is preferably substantially the same as the outside diameter of the hose 6 to fit slidably but frictionally on the hose. The handle is adapted to be moved over the hose which embraces the stem 11 of the nozzle 10 to compress the wall of the hose thereby causing a binding action between the hose and the handle and the stem 11 of the nozzle holding the nozzle securely but detachably in place.

The rubbing element 12 may be of the shape disclosed or any other preferred shape and for the purpose of securing the same on the handle substantially independently of the nozzle 10, I prefer to provide the rubbing element with a skirt 14 in the form of a sleeve adapted to surround the forward end of the handle 13 and to be clamped upon said end of the handle by a detachable spring clamp 15 provided with a connecting slot and hook as disclosed at 16, Fig. 1. By means of this attaching clamp the rubbing element 12 is securely held on the handle so that any force or pull exerted on it will ordinarily be transferred to the handle 13 rather than to the nozzle 10.

I prefer to provide the interior of the rubbing element with a pocket 16 which not only renders the rubbing element more flexible to simulate the operation of a mop but which also forms a reservoir for water insuring that the lower end of the rubbing element is supplied with a sufficient amount of cleansing fluid such as water. The pocket 16 in the rubbing element and the inside of the nozzle also may constitute a receptacle for a cleansing agent such as soap, and the inside of the nozzle is of such size that it may receive a fairly large piece of soap and into which the soap may be pushed as the rubbing element is collapsed or distorted by pressure during the washing operation.

To strengthen the nozzle its forward edge is preferably rolled as indicated at 17 and the roll is directed outwardly so as not to interfere with the flow of the cleansing fluid or the movement of any cleansing agent such as soap. This roll also engages the wall of the rubbing element relieving the strain upon the skirt portion 14 to a certain extent during certain movements of the device. The relatively large nozzle prevents the rubbing element from collapsing in the region of the walls of the nozzle.

To supply a small amount of water to the upper portion of the rubbing element which is usually not employed in the rubbing process, I provide the wall of the nozzle with a series of perforations indicated at 18 arranged in any suitable manner and preferably as disclosed, to provide equal distribution of water to the upper portion of the rubbing element 12. The water flowing through the upper portion of the rubbing element keeps this portion of the rubbing element clean and when the device is held in the position shown in Fig. 1 an increased volume of water flowing through the rubbing element at this point may be used for rinsing the dishes. When the device is used for rinsing as well as washing, it is preferable to use just enough cleansing agent such as soap to effect the washing or to employ a cake of soap or a soap container of a size to be received in the pocket in the rubbing element to insure a flow of clean water through the upper portion of the rubbing element for rinsing.

If desired the rubbing element may be constructed of sponge rubber as shown or any other suitable porous rubbing material and for scouring purposes I may construct the rubbing element of steel wool or the like and because of the detachable connection between the rubbing element and the handle various types of rubbing, scouring, and nozzle elements may be used successively if found necessary in scouring, washing and rinsing dishes and the like.

While I have described my invention with particularity with reference to a specific disclosure of the invention now believed best suited for a particular use, it is to be understood that I reserve the right to make all such changes in construction as fall within the principles of my invention and the scope of the appended claims.

I claim:

1. A washing device comprising a fluid supply hose, a nozzle and a nozzle enclosing porous rubbing element secured thereto, said nozzle having its end formed to direct the supply of fluid to the end of the rubbing element during washing and its side walls perforated to direct the supply of fluid through the side of the rubbing element during rinsing, said rubbing element having a relatively thick wall portion opposite the end of said nozzle and a thinner wall portion surrounding the side walls of said nozzle, whereby when the nozzle is directed downwardly the supply of water will be directed toward the rubbing end of the element and when the nozzle is directed horizontally fluid will pass freely through the side walls of the nozzle and rubbing element.

2. An elongated hollow porous rubbing element having an opening at one end thereof through which fluid is delivered into the rubbing element and having a relatively thick rubbing wall portion opposite said opening and a thinner rinsing wall portion adjacent said opening.

IRENE A. DEADY.